US012150190B2

(12) United States Patent
Tang

(10) Patent No.: US 12,150,190 B2
(45) Date of Patent: Nov. 19, 2024

(54) RESOURCE ESTABLISHING METHOD, AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 513 days.

(21) Appl. No.: 17/219,662

(22) Filed: Mar. 31, 2021

(65) Prior Publication Data

US 2021/0219364 A1 Jul. 15, 2021

Related U.S. Application Data

(63) Continuation of application No. PCT/CN2019/071489, filed on Jan. 11, 2019.

(51) Int. Cl.
*H04W 80/10* (2009.01)
*H04W 28/02* (2009.01)
(Continued)

(52) U.S. Cl.
CPC ....... *H04W 76/15* (2018.02); *H04W 28/0268* (2013.01); *H04W 28/10* (2013.01); *H04W 84/042* (2013.01); *H04W 84/12* (2013.01)

(58) Field of Classification Search
CPC . H04W 76/15; H04W 28/0268; H04W 28/10; H04W 84/042; H04W 84/12; H04W 76/11
See application file for complete search history.

(56) References Cited

U.S. PATENT DOCUMENTS 11,785,497 B2 * 10/2023 Puente Pestañ a et al. ................. H04L 41/16 370/236
11,950,198 B2 * 4/2024 Wang .................... H04W 76/16
(Continued)

FOREIGN PATENT DOCUMENTS

CN 108632904 A 10/2018
EP 3621343 A1 3/2020
(Continued)

OTHER PUBLICATIONS

3GPP TSG-CT WG1 Meeting#117, C1-193519 (Year: 2019).*
(Continued)

*Primary Examiner* — Faruk Hamza
*Assistant Examiner* — Abusayeed M Haque
(74) *Attorney, Agent, or Firm* — Perkins Coie LLP

(57) ABSTRACT

A method for establishing a resource, includes: establishing a network resource corresponding to a first access technology of a quality of service (QOS) flow; and receiving first indication information sent by a terminal device or a user plane function (UPF) network element, where the first indication information is used to instruct to establish a network resource corresponding to a second access technology of the QoS flow, the first access technology is one of a 3GPP access technology or a non-3GPP access technology, and the second access technology is the other of the 3GPP access technology or the non-3GPP access technology.

18 Claims, 6 Drawing Sheets

(51) Int. Cl.
  *H04W 28/10* (2009.01)
  *H04W 72/543* (2023.01)
  *H04W 76/15* (2018.01)
  *H04W 84/04* (2009.01)
  *H04W 84/12* (2009.01)

(56) References Cited

U.S. PATENT DOCUMENTS

| | | | | |
|---|---|---|---|---|
| 2018/0262924 A1* | 9/2018 | Dao | | H04W 72/535 |
| 2018/0270781 A1 | 9/2018 | Baek et al. | | |
| 2018/0331944 A1* | 11/2018 | Salkintzis | | H04L 45/24 |
| 2019/0007992 A1 | 1/2019 | Kim et al. | | |
| 2019/0208550 A1* | 7/2019 | Ko | | H04L 5/0094 |
| 2021/0219371 A1* | 7/2021 | Youn | | H04W 48/18 |

FOREIGN PATENT DOCUMENTS

| | | | | |
|---|---|---|---|---|
| EP | 3755117 A1 | 12/2020 | | |
| WO | 2018171588 A1 | 9/2018 | | |
| WO | 2018174509 A1 | 9/2018 | | |
| WO | 2019198960 A1 | 10/2019 | | |
| WO | WO-2019197016 A1 * | 10/2019 | | H04W 28/086 |

OTHER PUBLICATIONS

3GPP TSG CT WG1 Meeting#116, C1-192467 (Year: 2019).*
CNIPA, First Office Action for Chinese Patent Application No. 202010695798.1. Mail Date: Jun. 18, 2021. 15 pages with English translation.
EPO, Extended European Search Report for European Patent Application No. 19908190.2. Mail Date: Sep. 10, 2021. 9 pages.
Huawei et al. "ATSSS Rule definition and update of TFCP" S2-184475; SA WG2 Meeting #127, Sanya, China, Apr. 16-20, 2018. 10 pages.
LG Electronics "QoS framework for Multi-Access PDU Session" S2-1810964; 3GPP TSG-SA WG2 Meeting #129; Dongguan, China, Oct. 15-19, 2018. 3 pages.
First Examination Report of the Australian application No. 2019421503, issued on Mar. 8, 2022. 3 pages.
First Examination Report of the European application No. 19908190. 2, issued on May 18, 2022. 8 pages.
Examination Report for European Application No. 19908190.2 issued Nov. 16, 2022. 2 pages.
ZTE, "S2-1810979: Evaluation on Combined Establishment Procedure and Separated Establishment Procedure", SA WG2 Meeting #129, Oct. 18, 2018.
International Search Report dated Sep. 26, 2019 cited in PCT/CN2019/071489.
Examination Report for Indian Application No. 202127014521 issued Aug. 23, 2022. 5 pages with English translation.
Examination Report No. 2 for Australian Application No. 2019421503 issued Aug. 1, 2022. 4 pages.
Examiner's Report for Canadian Application No. 3120398 issued Aug. 11, 2022. 4 pages.
Fourth Examination Report of the EP application No. 19908190. 2,issued on May 11, 2023. 8 pages.

* cited by examiner

RESOURCE ESTABLISHING METHOD, AND DEVICE

CROSS-REFERENCE TO RELATED APPLICATION

The present application is a continuation application of International PCT Application No. PCT/CN2019/071489, having an international filing date of Jan. 11, 2019. The entire content of which is hereby incorporated by reference.

BACKGROUND

Technical Field

Implementations of the present disclosure relate to the field of communications, and more specifically, to a method and a device for establishing a resource.

Related Art

In the fifth-generation (5G) mobile communications technology network, a protocol data unit (PDU) session may transmit data by using a multi-access (MA) technology, that is, by using the 3rd Generation Partnership Project (3GPP) access technologies such as Long Term Evolution (LTE), new radio (NR)), and non-3GPP (wireless local area network (WLAN)).

However, it is an urgent need for a terminal device to support the MA technology.

SUMMARY

Implementations of the present disclosure provide a method and a device for establishing a resource to enable a terminal device to support an MA technology.

According to a first aspect, a method for establishing a resource is provided, including: establishing a network resource corresponding to a first access technology of a quality of service (QOS) flow; and receiving first indication information sent by a terminal device or a user plane function (UPF) network element, where the first indication information is used to instruct to establish a network resource corresponding to a second access technology of the QoS flow, the first access technology is one of a 3GPP access technology or a non-3GPP access technology, and the second access technology is the other of the 3GPP access technology or the non-3GPP access technology.

According to a second aspect, a method for establishing a resource is provided, including: sending second indication information to a terminal device and/or a protocol data unit (UPF) network element, where the second indication information is used to indicate whether establishment of a network resource corresponding to a first access technology and a second access technology of a QoS flow is allowed, the first access technology is one of a 3GPP access technology or a non-3GPP access technology, and the second access technology is the other of the 3GPP access technology or the non-3GPP access technology.

According to a third aspect, a method for establishing a resource is provided, including: sending first indication information to a session management function (SMF) network element or a UPF network element when a network resource corresponding to a first access technology of a QoS flow is established, where the first indication information is used to instruct to establish a network resource corresponding to a second access technology of the QoS flow, the first access technology is one of a 3GPP access technology or a non-3GPP access technology, and the second access technology is the other of the 3GPP access technology or the non-3GPP access technology.

According to a fourth aspect, a method for establishing a resource is provided, including: receiving second indication information sent by an SMF network element, where the second indication information is used to indicate whether establishment of a network resource corresponding to a first access technology and a second access technology of a QoS flow is allowed, the first access technology is one of a 3GPP access technology or a non-3GPP access technology, and the second access technology is the other of the 3GPP access technology or the non-3GPP access technology; and determining, according to the second indication information when a network resource corresponding to the first access technology of the QoS flow is established, whether to send first indication information to the SMF network element or a UPF network element, where the first indication information is used to instruct to establish a network resource corresponding to the second access technology of the QoS flow.

According to a fifth aspect, a method for establishing a resource is provided, including: sending first indication information to an SMF network element when a network resource corresponding to a first access technology of a QoS flow is established, where the first indication information is used to instruct to establish, for a terminal device, a network resource corresponding to a second access technology of the QoS flow, the first access technology is one of a 3GPP access technology or a non-3GPP access technology, and the second access technology is the other of the 3GPP access technology or the non-3GPP access technology.

According to a sixth aspect, a method for establishing a resource is provided, including: receiving second indication information sent by an SMF network element, where the second indication information is used to indicate whether establishment of a network resource corresponding to a first access technology and a second access technology of a QoS flow is allowed, the first access technology is one of a 3GPP access technology or a non-3GPP access technology, and the second access technology is the other of the 3GPP access technology or the non-3GPP access technology; and determining, according to the second indication information when a network resource corresponding to the first access technology of the QoS flow is established, whether to send first indication information to the SMF network element, where the first indication information is used to instruct to establish a network resource corresponding to the second access technology of the QoS flow.

According to a seventh aspect, a network device is provided. The network device can perform the method according to the first aspect, the second aspect, or any optional implementation thereof. Specifically, the network device may include a functional module that is configured to perform the method according to the first aspect, the second aspect, or any possible implementation thereof.

According to an eighth aspect, a terminal device is provided. The terminal device can perform the method according to the third aspect, the fourth aspect, or any optional implementation thereof. Specifically, the terminal device may include a functional module that is configured to perform the method according to the third aspect, the fourth aspect, or any possible implementation thereof.

According to a ninth aspect, a network device is provided. The network device can perform the method according to the fifth aspect, the sixth aspect, or any optional implementation thereof. Specifically, the network device may include a functional module that is configured to perform the method according to the fifth aspect, the sixth aspect, or any possible implementation thereof.

According to a tenth aspect, a network device is provided, including a processor and a memory. The memory is configured to store a computer program, and the processor is configured to call and run the computer program stored in the memory to perform the method according to the first aspect, the second aspect, or any possible implementation thereof.

According to an eleventh aspect, a terminal device is provided, including a processor and a memory. The memory is configured to store a computer program, and the processor is configured to call and run the computer program stored in the memory to perform the method according to the third aspect, the fourth aspect, or any possible implementation thereof.

According to a twelfth aspect, a network device is provided, including a processor and a memory. The memory is configured to store a computer program, and the processor is configured to call and run the computer program stored in the memory to perform the method according to the fifth aspect, the sixth aspect, or any possible implementation thereof.

According to a thirteenth aspect, a chip is provided, and is configured to implement the method according to the first aspect, the second aspect, or any possible implementation thereof. Specifically, the chip includes a processor, configured to call a computer program from a memory and run the computer program, so that a device equipped with the chip performs the method according to the first aspect, the second aspect, or any possible implementation thereof.

According to a fourteenth aspect, a chip is provided, and is configured to implement the method according to the third aspect, the fourth aspect, or any possible implementation thereof. Specifically, the chip includes a processor, configured to call a computer program from a memory and run the computer program, so that a device equipped with the chip performs the method according to the third aspect, the fourth aspect, or any possible implementation thereof.

According to a fifteenth aspect, a chip is provided, and is configured to implement the method according to the fifth aspect, the sixth aspect, or any possible implementation thereof. Specifically, the chip includes a processor, configured to call a computer program from a memory and run the computer program, so that a device equipped with the chip performs the method according to the fifth aspect, the sixth aspect, or any possible implementation thereof.

According to a sixteenth aspect, a computer-readable storage medium is provided, and is configured to store a computer program. The computer program causes a computer to perform the method according to the first aspect, the second aspect, or any possible implementation thereof.

According to a seventeenth aspect, a computer-readable storage medium is provided, and is configured to store a computer program. The computer program causes a computer to perform the method according to the third aspect, the fourth aspect, or any possible implementation thereof.

According to an eighteenth aspect, a computer-readable storage medium is provided, and is configured to store a computer program. The computer program causes a computer to perform the method according to the fifth aspect, the sixth aspect, or any possible implementation thereof.

According to a nineteenth aspect, a computer program product is provided, including a computer program instruction. The computer program instruction causes a computer to perform the method according to the first aspect, the second aspect, or any possible implementation thereof.

According to a twentieth aspect, a computer program product is provided, including a computer program instruction. The computer program instruction causes a computer to perform the method according to the third aspect, the fourth aspect, or any possible implementation thereof.

According to a twenty-first aspect, a computer program product is provided, including a computer program instruction. The computer program instruction causes a computer to perform the method according to the fifth aspect, the sixth aspect, or any possible implementation thereof.

According to a twenty-second aspect, a computer program is provided. When running on a computer, the computer program causes the computer to perform the method according to the first aspect, the second aspect, or any possible implementation thereof.

According to a twenty-third aspect, a computer program is provided. When running on a computer, the computer program causes the computer to perform the method according to the third aspect, the fourth aspect, or any possible implementation thereof.

According to a twenty-fourth aspect, a computer program is provided. When running on a computer, the computer program causes the computer to perform the method according to the fifth aspect, the sixth aspect, or any possible implementation thereof.

According to the technical solution provided in the implementations of the present disclosure, a network resource corresponding to another access technology of a QoS flow can be established at the request of a terminal device or a UPF network element, so that the terminal device can transmit data on a network resource corresponding to two access technologies and support an MA technology.

DETAILED DESCRIPTION

The technical solutions of the implementations of this application will be described in the following with reference to the accompanying drawings. It is obvious that the implementations to be described are a part rather than all of the implementations of this application. All other implementations obtained by a person of ordinary skill in the art based on the implementations of the present disclosure without creative efforts shall fall within the protection scope of the present disclosure.

The technical solutions in the implementations of the present disclosure are applicable to various communications systems, for example, a Global System of Mobile communications (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communications system or a 5G system, or a communications system of a later version.

Figure 1:
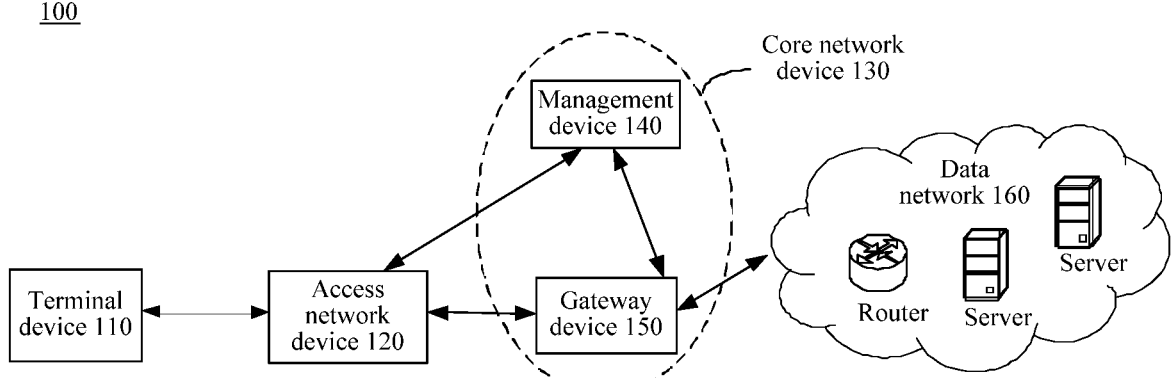
FIG. 1 is a schematic diagram of a communications system architecture applied in an implementation of the present disclosure.

FIG. 1 is a schematic block diagram of a wireless communications system architecture 100 according to an implementation of the present disclosure. As shown in FIG. 1, the system architecture 100 includes a terminal device 110, an access network device 120, a core network device 130, and a data network (DN) 160. The core network device 130 includes a management device 140 and a gateway device 150. The terminal device 110 in FIG. 1 can be configured to be connected, through a wireless air interface, to the access network device 120 deployed by an operator, and then be connected to a data network through the core network device 130. The access network device 120 is primarily configured to implement functions such as a wireless physical layer function, resource scheduling, wireless resource management, wireless access control, and mobility management. The core network device 130 may include the management device 140 and the gateway device 150. The management device 140 is primarily used for device registration, security authentication, mobility management, and location management of the terminal device. The gateway device 150 is primarily configured to establish a channel with the terminal device, and forward, on this channel, a data packet between the terminal device and an external data network. The data network 160 may correspond to multiple different service domains such as an Internet Protocol Multimedia Subsystem (IMS), the Internet, an Internet Protocol Television (IPTV), and another operator business domain, and is primarily configured to provide multiple types of data services for the terminal device, where the terminal device may include network devices such as a server (including a server that provides a multicast service), a router, and a gateway. It should be noted that, FIG. 1 is merely an exemplary architecture diagram. Aside the functional units shown in FIG. 1, the network architecture may further include another functional unit or functional entity, and this is not limited in this implementation of this application.

The above terminal device may be user equipment (UE) such as a mobile phone or a computer, and may further be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite wireless device, a wireless modem card, a TV set top box (STB), customer premise equipment (CPE), and/or another device used to communicate on a wireless system. The above access network device may be an access network (AN)/radio access network (RAN) device, or a network composed of multiple 5G-AN/5G-RAN nodes. The 5G-AN/5G-RAN node may be: an access point (AP), a next-generation nodeB (NR nodeB, or gNB), a gNB in which a central unit (CU) is separated from a distributed unit (DU), a transmission-receive point (TRP), a transmission point (TP), or another access node. The above core network devices may include functional units such as an access & mobility function (AMF), a session management function (SMF), a policy control function (PCF), a user plane function (UPF). The functional units may work independently or may be combined to implement some control functions. For example, the AMF, the SMF, and the PCF may be combined as a management device to implement access control and mobility management functions of the terminal device such as access authentication, security encryption, and location registration, implement session management functions such as establishment, release, and modification of a user plane transmission path, and implement functions such as analysis of some slice-related data (such as congestion) and data related to the terminal device. As a gateway device, the UPF primarily implements functions such as routing and forwarding of user plane data, for example, data packet filtering, data transmission/forwarding, rate control, and billing information generation for the terminal device.

Figure 2:
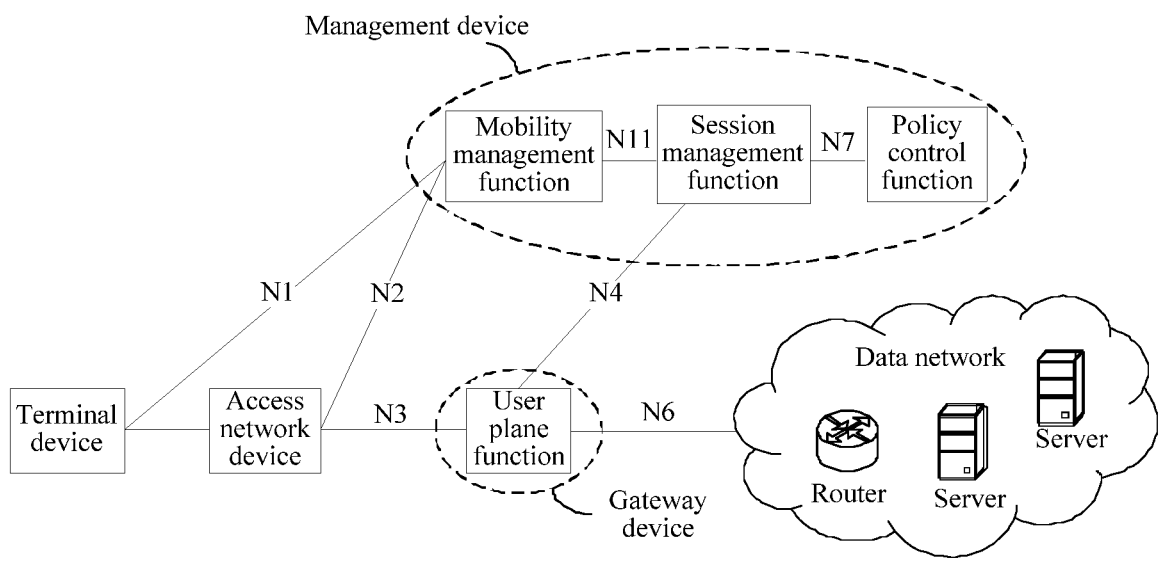
FIG. 2 is a schematic diagram of another communications system architecture applied in an implementation of the present disclosure.

FIG. 2 is a schematic diagram of a network architecture according to an implementation of the present disclosure. In FIG. 2, a connection can be established and communication can be implemented between different functional units through a next generation (NG) network interface. For example, the terminal device establishes an air interface connection with a RAN device through a new radio (NR) interface to transmit user plane data and control plane signaling. The terminal device may establish a control plane signaling connection with the AMF through an NG interface 1 (N1 for short). An AN/RAN device such as a next generation radio access base station (NR NodeB, or gNB) may establish a user plane data connection with the UPF through an NG interface 3 (N3 for short). The AN/RAN device may establish a control plane signaling connection with the AMF through an NG interface 2 (N2 for short). The UPF may establish a control plane signaling connection with the SMF through an NG interface 4 (N4 for short). The UPF may exchange user plane data with a data network through an NG interface 6 (N6 for short). The AMF may establish a control plane signaling connection with the SMF through an NG interface 11 (N11 for short). The SMF may establish a control plane signaling connection with the PCF through an NG interface 7 (N7 for short). It should be noted that FIG. 2 is merely an exemplary architecture diagram. The network architecture may further include, aside from the functional units shown in FIG. 2, another functional unit or functional entity. For example, the core network devices may further include another functional unit such as a unified data management function (UDM), and this is not limited in this implementation of this application.

Using an NR system as an example, with the development of technologies, a PDU session may transmit data by using a multi-access (MA) technology. Using a 3GPP access technology and a non-3GPP access technology as an example, a PDU session may transmit data by simultaneously using both the 3GPP access technology and the non-3GPP access technology at the same time. The 3GPP access technology may be, for example, an NR or LTE access technology, and the non-3GPP access technology may be, for example, a WLAN access technology. This PDU session that supports the MA technology may be referred to as an MA PDU session.

A scenario of an MA PDU session is described with reference to FIG. 3 in the following.

Figure 3:
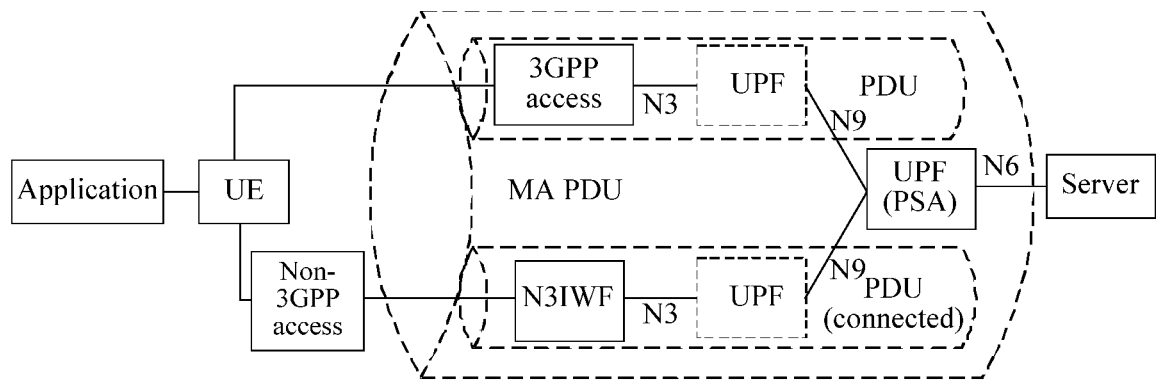
FIG. 3 is a schematic diagram of an MA PDU session scenario according to an implementation of the present disclosure.

FIG. 3 shows a scenario in which a terminal device can simultaneously use a 3GPP access technology and a non-3GPP access technology to transmit data. A UE may include multiple applications. Each application may use multiple PDU sessions, one PDU session may include multiple quality of service (QOS) flows, and one QoS flow may use an MA technology.

The data on the QoS flow may be transmitted to a 3GPP access technology and a non-3GPP access technology. Data on the 3GPP access technology can be transmitted to a 3GPP access network device. The 3GPP access network device can establish a connection with the UPF through an N3 interface, and the data on the 3GPP access technology can be transmitted to the UPF through the 3GPP access network device. An access network device on a non-3GPP access technology may include a non-3GPP InterWorking Function (N3IWF). The N3IWF establishes a connection with the UPF through an N3 interface, and data on the non-3GPP access technology can be transmitted to the UPF through the N3IWF. The UPF on the 3GPP access technology and the UPF on the non-3GPP access technology may be the same UPF or different UPFs.

The UPF on the 3GPP access technology and the UPF on the non-3GPP access technology can be connected to a PDU session anchor (PSA) through an N9 interface, and the PSA may be configured to manage the two UPFs. The PSA can establish a connection with a server, so that the data of the terminal device can send data to the UPF on the 3GPP access technology and/and the non-3GPP access technology through the MA PDU session.

Generally, 3GPP access technology has relatively high transmission efficiency and a relatively high transmission speed, but costs of data transmission may be relatively high; the non-3GPP access technology transmission efficiency and a transmission speed that are lower than those of the 3GPP access technology, but costs of data transmission may be relatively low. Therefore, for a terminal device that supports the MA technology, a data packet requiring a high transmission speed and high efficiency may be transmitted on the 3GPP access technology, so as to achieve a relatively high transmission speed; and a data packet that requires a low transmission speed and low transmission efficiency may be transmitted on the non-3GPP, so as to save more costs. For the network device, resources on the non-3GPP access technology can be used more effectively and the transmission speed is improved.

During data transmission, network congestion may occur. In the case of network congestion, all data packets may be discarded. To meet different QOS requirements of the terminal device for different applications, the network device needs to be able to allocate and schedule resources according to the requirements of the terminal device, and provide different QoS for different data flows. For example, a data packet with high timeliness and importance is processed preferentially, and an ordinary data packets with low timeliness is provided with a relatively low priority, and may even be discarded in the case of network congestion. In this way, transmission reliability of an important data packet can be ensured. This causes a quality of service (QOS) flow, which configures a network environment of the QoS, improves predictability of a network performance, and may further effectively allocate network bandwidths and use network resources more properly.

The network device in this implementation of the present disclosure may include another network device such as the core network device and the access network device described in FIG. 1 and FIG. 2.

The QoS flow may be divided according to parameters corresponding to the QoS flow. The parameters corresponding to the QoS flow may include, for example, a transmission bandwidth, a transmission delay, a data packet loss rate, a 5G QoS identifier (5QI), a transmission priority, and the like.

After the terminal device accesses a network, the network device separately configures parameters corresponding to the QoS flow for the terminal device, an access network (AN) device, and the UPF. In this way, for the same QoS flow, the terminal device, the AN device, and the UPF can transmit both downlink data and uplink data by using the same QoS flow to meet QoS requirements of data transmission. The 3GPP access network may be, for example, a radio access network (RAN), and the non-3GPP access network may be, for example, a non-3GPP interworking function (N3IWF).

Each QoS flow has a corresponding QoS rule and a corresponding QoS configuration. The network device may send a QoS parameter and a QoS rule to the terminal device. The QoS parameter may include a QoS flow identifier (QFI) and a 5G QoS identifier (5QI). In some cases, the QoS parameter may further include a bit rate, and the like. The QoS rule may also include a QFI. For one QoS flow, the QFI in the QoS parameter corresponding to the QoS flow is the same as the QFI in the QoS rule. In this way, after receiving the QoS rule, the terminal device can learn the QoS flow to which the QoS rule is applicable, and then can transmit the data to the correct QoS flow.

Similarly, the network device may also send a QoS parameter and a QoS configuration to the AN device. The QFI is configured in both the QoS parameter and the QoS configuration. For the same QoS flow, the QFI in the QoS parameter corresponding to the QoS flow is the same as the QFI in the QoS rule. When transmitting data, the terminal device can transmit the data to the correct QoS flow according to the QFI.

Optionally, the network device may be an SMF network element device.

A terminal device may establish multiple PDU sessions, and each PDU session may have one or more QoS flows. For a PDU session that supports the MA technology, data on each QoS flow can be transmitted using the MA technology.

For example, for a PDU session that supports both a 3GPP access technology and a non-3GPP access technology, the data on each QoS flow may be transmitted using the 3GPP access technology, or using the non-3GPP access technology, or using both the 3GPP access technology and the non-3GPP access technology.

However, how does a terminal device support the MA technology becomes a problem to be urgently resolved.

Figure 4:
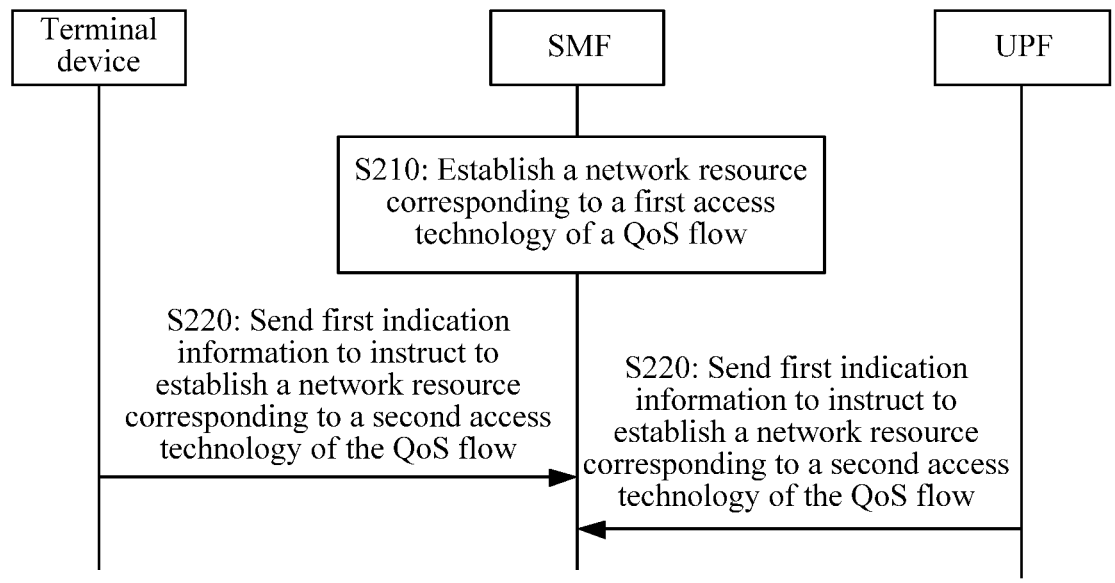
FIG. 4 is a schematic diagram of a method for establishing a resource according to an implementation of the present disclosure.

An implementation of the present disclosure provides a method for establishing a resource to enable a terminal device to support the MA technology. As shown in FIG. 4, the method includes steps 210 to 220.

S210: An SMF network element establishes a network resource corresponding to a first access technology of a QoS flow.

The first access technology may be one of a 3GPP access technology and a non-3GPP access technology, and the second access technology may be the other of the 3GPP access technology and the non-3GPP access technology.

The establishing the network resource by the SMF network element in this implementation of the present disclosure does not imply that the SMF independently completes the whole process of establishing network resource, and may be that the SMF participates in the process of establishing the network resource. For example, an SMF network element may establish a core network resource, the AN device may establish an access network resource, and an SMF network element and the AN device may jointly complete the establishment of a network resource.

In the case that the network resource corresponding to the first access technology of the QoS flow has been established, the terminal device may transmit data on the QoS flow over the first access technology.

This implementation of the present disclosure does not limit the manner in which the terminal device determines the network resource corresponding to the first access technology of the QoS flow.

For example, the SMF network element may send a piece of non-access stratum (NAS) signaling to the terminal device to indicate completion of establishment of the network resource corresponding to the first access technology of the QoS flow. For example, the SMF network element may send a PDU session establishment acceptance message to the terminal device. The PDU session establishment acceptance message may include indication information indicating completion of establishing the network resource corresponding to the first access technology of the QoS flow. For another example, the SMF network element may send a PDU session modification command to the terminal device. The PDU session modification command may include indication information indicating completion of establishing the network resource corresponding to the first access technology of the QoS flow.

The AN device may indicate to the terminal device completion of establishing the network resource corresponding to the first access technology of the QoS flow. After establishing, for the terminal device, a core network resource corresponding to the first access technology of the QoS flow, the SMF network element may send indication information to the AN to instruct to establish an access network resource corresponding to the first access technology of the QoS flow. After establishing the access network resource, the AN device may send resource configuration information to the terminal device. After receiving the resource configuration information, the terminal device can determine completion of establishing the network resource corresponding to the first access technology of the QoS flow.

The establishing the core network resource by the SMF network element may be that the SMF network element configures the core network resource for the terminal device. The establishing the access network resource by the AN device may be that the AN device configures the access network resource for the terminal device.

S220: The terminal device or the UPF network element sends first indication information to the SMF network element, where the first indication information is used to instruct to establish a network resource corresponding to the second access technology of the QoS flow.

The terminal device may use PDU session modification request signaling to carry the first indication information. For example, the terminal device may send PDU session modification request signaling including the first indication information to the SMF network element to instruct to establish a network resource corresponding to the second access technology of the QoS flow.

The UPF network element may use N4 update session request signaling to carry the first information. For example, the UPF network element may send N4 update session request signaling including the first indication information to the SMF network element to instruct to establish a network resource corresponding to the second access technology of the QoS flow.

After the terminal device accesses the network, the SMF network element may establish, for the terminal device, a network resource corresponding to the first access technology of the PDU session, and the terminal device may transmit data by using the network resources corresponding to the first access technology. For the network resource corresponding to the second access technology, the SMF network element may, according to some policy requirements of the operator, skip establishing the network resource corresponding to the second access technology. For example, if the network corresponding to the second access technology is currently under a heavy load, or the requirement of the terminal device on a packet loss ratio is low, or it is determined according to the QoS requirement of the terminal device that the requirement of the terminal device on bandwidths is low at the same time, then the SMF network element may establish, for the terminal device, a network resource corresponding to only one access technology.

While the terminal device transmits data on the network resource corresponding to the first access technology, if it is detected that a switching condition for switching to the second access technology for transmission is satisfied, the terminal device needs to switch the data to the network resource corresponding to the second access technology for transmission. However, because the network device has not yet established the network resource corresponding to the second access technology, in this case, how does the terminal device implement data transmission and support the MA technology becomes a problem to be urgently resolved.

In the technical solution according to this implementation of the present disclosure, the terminal device or the UPF network element may send the first indication information to the SMF network element to request to establish a network resource corresponding to the second access technology. In this way, the SMF may, according to the first indication information, establish a network resource corresponding to the second access technology. The terminal device may, according to the switching condition, switch the data on the Qos flow to the network resource corresponding to the second access technology for transmission, thereby supporting MA technology.

The establishing, by the SMF network element for the terminal device, a network resource corresponding to the access technology in this implementation of the present disclosure is not limited to the SMF network element establishing the network resource directly, and may also include a scenario in which the SMF network element uses other network elements such as an access-network network element to establish a network resource for the terminal device.

The first indication information may be sent without having established the network resource corresponding to the second access technology of the QoS flow. This implementation of the present disclosure does not limit the timing or triggering condition for the terminal device to send the first indication information. For example, the first indication information may be sent when the terminal device needs to transmit data on the network resource corresponding to the second access technology of the QoS flow, for example, when the terminal device detects satisfaction of the switching condition of switching to the second access technology of the QoS flow, or whenever the terminal device detects no establishment of the network resource corresponding to the second access technology of the QoS flow.

Content of the second indication information is not limited in this implementation of the present disclosure.

As an example, the first indication information may be switch-access indication information. After receiving the switch-access indication information, the SMF can determine that the terminal device intends to switch to another access technology of the QoS flow to transmit data. Due to awareness of the access technology corresponding to which the network resource has been established for the terminal device currently, the SMF may establish a network resource corresponding to another access technology of the QoS flow according to the first indication information. For example, if the SMF network element has previously established a network resource corresponding to 3GPP of the QoS flow for the terminal device, the SMF network element may establish a network resource corresponding to non-3GPP of the QoS flow according to the first indication information. If the SMF network element has previously established a network resource corresponding to non-3GPP of the QoS flow for the terminal device, the SMF network element may establish a network resource corresponding to 3GPP of the QoS flow according to the first indication information.

For example, the first access technology is a 3GPP access technology and the second access technology is a non-3GPP access technology. After the terminal device accesses the network, the SMF establishes a network resource corresponding to 3GPP for the QoS flow of the terminal device, and the terminal device may route data on the first QoS flow to the network resource corresponding to 3GPP for transmission. During the transmission process, the terminal device detects satisfaction of the switching condition of switching to non-3GPP, for example, detects poor network conditions of the 3GPP, then the terminal device needs to switch the data on the first QoS flow to non-3GPP for transmission. At this time, if the terminal device detects that the SMF has not establish a network resource corresponding to non-3GPP, the terminal device may send the first indication information to the SMF network element. After receiving the first indication information, the SMF network element determines the network resource that the terminal device requests to establish and that corresponds to the access technology of the QoS flow. Because the SMF network element is aware that the network resource corresponding to 3GPP of the QoS flow has been established for the terminal device currently, the SMF network element may, based on the first indication information, establish a network resource corresponding to non-3GPP of the QoS flow.

For another example, the first indication information may include identification information of the second access technology. For example, the first indication information may include 3GPP or non-3GPP indication information. In this way, after receiving the first indication information, the SMF can clearly learn the access technology corresponding to which the network resource is to be established at the request of the terminal device. For example, a manner of 1 bit may be used for indication. The bit value being 1 indicates 3GPP, and the bit value being 0 indicates non-3GPP.

Optionally, the first indication information may be carried in a NAS message. For example, the terminal device may send the first indication information by using a PDU session modification request message; or the first indication information may be carried in an update session request message sent by the UPF network element, and the UPF network element may send the first indication information by using an update session request message.

Optionally, the network resource corresponding to one access technology may include an access network resource and a core network resource. The establishing, by the SMF for the terminal device, a network resource corresponding to the second access technology of the QoS may include: establishing, by the SMF network element for the terminal device, a core network resource and an access network resource corresponding to the second access technology of the QoS flow.

The terminal device or the UPF network element may request the SMF network element to establish network resources corresponding to the access technologies of one or more QoS flows. That is, the first indication information may be pertinent to one QoS flow or multiple QoS flows. For example, for all QoS flows belonging to one PDU session, the terminal device or the UPF network element may request to establish network resources corresponding to the access technologies of all QoS flows of one PDU session.

Optionally, the terminal device or the UPF network element may further send a first identifier to the SMF network element. The first identifier may be used to identify a QoS flow. The first identifier may be in correspondence to the QoS flow. After receiving the first identifier and the first indication information, the SMF network element determines the access technology corresponding to which the network resource is to be established as intended by the terminal device.

Content of the first identifier is not limited in this implementation of the present disclosure.

For example, the first identifier may include a QoS flow identifier. When configuring a QoS flow for a terminal device, an SMF network element may configure a corresponding QoS identifier such as a QFI for each QoS flow. In this way, when requesting to establish a network resource corresponding to the access technology of the QoS flow, the terminal device can also send the QoS flow identifier to the SMF network element. Because the SMF network element is aware of the correspondence between the QoS identifier and the QoS flow, the SMF network element can, according to the QoS flow identifier, determine the QoS flow of which the network device intends to establish a network resource corresponding to the access technology.

For another example, the first identifier may include an access traffic steering, switching and splitting (ATSSS) rule identifier. The ATSSS rule identifier may also be in correspondence to the QoS flow. According to the correspondence between the ATSSS rule identifier and the QoS flow, the terminal device may send the ATSSS rule identifier corresponding to the requested QoS flow to the SMF network element. Due to awareness of the correspondence between the ATSSS rule identifier and the QoS flow, the SMF network element may determine the QoS flow according to the ATSSS rule identifier sent by the terminal device.

Before receiving the first indication information sent by the terminal device or the UPF network element, the SMF network element may send the correspondence between the ATSSS rule identifier and the QoS flow identifier to the terminal device or the UPF network element. The terminal device or the UPF network element may send the ATSSS rule identifier to the SMF network element according to the correspondence between the ATSSS rule identifier and the QoS flow identifier, to request to establish a network resource corresponding to the access technology of the QoS flow corresponding to the ATSSS rule identifier. After receiving the ATSSS rule identifier sent by the terminal device or the UPF network element, the SMF network element may also determine the QoS flow according to the correspondence between the ATSSS rule identifier and the QoS flow identifier, and then establish a network resource corresponding to the access technology of the QoS flow corresponding to the ATSSS rule identifier.

For example, an ATSSS rule identifier 1 corresponds to QoS flow identifiers 1, 2, and 3. After the terminal device sends the ATSSS identifier 1, the SMF network element may, according to the correspondence between the ATSSS rule ID and the QoS flow identifier, determine that the terminal device intends to establish a network resource corresponding to the access technologies of the QoS flows 1, 2, and 3, and therefore, the SMF network element may establish all network resources corresponding to the access technologies of QoS flows 1, 2, and 3.

In this technical solution, an ATSSS rule identifier is used to request establishment of the network resource corresponding to the access technology of the QoS flow, so that the network resource corresponding to the access technologies of multiple QoS flows can be established through one piece of signaling, without the need to request establishment by sending multiple pieces of signaling, thereby saving signaling overheads.

After receiving the first indication information sent by the terminal device, the SMF network element may further determine whether establishment of the network resource corresponding to the second access technology of the QoS flow is allowed. If it is determined that establishment of the network resource corresponding to the second access technology of the QoS flow is allowed, the SMF network element establishes the network resource corresponding to the second access technology of the QoS flow; if it is determined that establishment of the network resource corresponding to the second access technology of the QoS flow is not allowed, the SMF network element establishes no network resource corresponding to the second access technology of the QoS flow.

Whether establishment of the network resource corresponding to the second access technology of the QoS flow is allowed may be determined by the SMF network element according to a specific policy requirement, for example, determined according to an AN resource establishment mode. The AN resource establishment mode may be used to indicate whether establishment of a network resource corresponding to a first access technology and a second access technology of one QoS flow is allowed.

Optionally, the SMF network element may also send second indication information to the terminal device or the UPF network element. The second indication information is used to indicate whether establishment of the network resource corresponding to the first access technology and the second access technology of one QoS flow is allowed. The second indication information may be an AN resource establishment mode.

The terminal device or the UPF network element may, according to the second indication information, determine whether the SMF network element allows establishment of the network resource corresponding to the first access technology and the second access technology of the QoS flow, and then further determine whether to send the first indication information to the SMF network element. If the SMF network element allows establishment of the network resource corresponding to the first access technology and the second access technology of the QoS flow, the first indication information may be sent to the SMF network element. If the SMF network element does not allow establishment of the network resource corresponding to the first access technology and the second access technology of the QoS flow, no first indication information is sent to the SMF network element.

In the technical solution provided in this implementation of the present disclosure, the SMF may send the second indication information to the terminal device or the UPF network element, and the terminal device or the UPF may, according to the decision of the SMF network element, determine whether to send a request for establishing the network resource corresponding to the second access technology of the QoS flow. In the case that the SMF network element does not allow establishment of the network resource corresponding to the second access technology of the QoS flow, no first indication information is sent to the SMF network element. This can prevent the terminal device or the UPF network element from frequently requesting to establish the network resource but being rejected, and save signaling overheads.

According to the first indication information, the SMF network element may establish the network resource corresponding to the second access technology of the QoS flow, and send, after completion of establishing the network resource corresponding to the second access technology of the QoS flow, third indication information to the terminal device or the UPF network element. The third indication information is used to indicate completion of establishing the network resource corresponding to the second access technology of the QoS flow.

The indication manner of the third indication information is not limited in this implementation of the present disclosure. The third indication information may explicitly or implicitly indicate completion of establishing the network resource corresponding to the second access technology of the QoS flow.

The third indication information includes indication information that indicates completion, and the third indication information explicitly indicates completion of establishing the network resource corresponding to the second access technology of the QoS flow. For example, the third indication information may use 1 bit for indication. The bit value being 1 indicates completion of establishing the network resource corresponding to the second access technology of the QoS flow, and the bit value being 0 indicates no establishment of the network resource corresponding to the second access technology of the QoS flow.

The third indication information implicitly indicates completion of establishing the network resource corresponding to the second access technology of the QoS flow. For example, the third indication information may include a resource configuration parameter of the QoS flow. After receiving the resource configuration parameter, the terminal device can determine completion of establishing the network resource corresponding to the second access technology of the QoS flow.

Optionally, the SMF network element may further send a second identifier to the terminal device or the UPF network element. The second identifier is used to identify a QoS flow. After receiving the third indication information and the second identifier, the terminal device or the UPF network element may determine completion of establishing the network resource corresponding to the second access technology of the QoS flow indicated by the second identifier.

The second identifier may include an ATSSS rule identifier and/or a QoS flow identifier.

Optionally, the first identifier and the second identifier may be the same. For example, the first identifier and the second identifier both include a QoS flow identifier and/or an ATSSS rule identifier. Alternatively, the first identifier is different from the second identifier. For example, the first identifier may include a QoS flow identifier, and the second identifier may include an ATSSS rule identifier; or the first identifier may include an ATSSS rule identifier, and the second identifier may include a QoS flow identifier.

The third indication information may be carried in a NAS message or an access stratum message.

If the first indication information is sent by the terminal device to the SMF network element, the SMF network element sends establishment completion indication information to the terminal device by using a PDU session modification command. After receiving the PDU session modification command, the terminal device can determine completion of establishing the network resource corresponding to the second access technology of the QoS flow.

The session modification command may explicitly or implicitly indicate to the terminal device that the establishment of the network resource is completed. For example, the session modification command may be indicated in other explicit manners such as a bit. For example, a bit may be used to indicate whether the establishment of the resource is completed. The bit value being 1 indicates completion of establishing the resource, and the bit value being 0 indicates no establishment of the resource, or the like. For another example, the session modification command may include a resource configuration parameter of the QoS flow, and the completion of resource establishment is indicated to the terminal device in such an implicit manner. After receiving the session modification command, the terminal device may determine completion of resource establishment according to the resource configuration parameter of the QoS flow.

If the first indication information is sent by the UPF network element to the SMF network element, the SMF network element indirectly sends the third indication information to the terminal device through an AN network element. The SMF may not send a NAS message to the terminal device, but instruct the AN network element to establish an access network resource for the terminal device, and then the AN network element sends the resource configuration parameter of the QoS flow to the terminal device. After receiving the resource configuration parameter sent by the AN network element, the terminal device can determine completion of establishing the network resource corresponding to the second access technology of the QoS flow, and can transmit data by using the network resource corresponding to the second access technology.

Of course, if the first indication information is sent by the UPF network element to the SMF network element, the SMF network element may also directly send the third indication information to the terminal device by using NAS signaling Optionally, the third indication information may be carried in a PDU session modification command.

According to the received third indication information, the UPF network element may send fifth indication information to the terminal device. The fifth indication information may be used to indicate completion of the network resource corresponding to the second access technology of the QoS flow.

After receiving the third indication information or the fifth indication information, the terminal device may, according to a specific switching condition, switch the data of the QoS flow to the network resource corresponding to the second access technology for transmission.

In the case that the SMF network element receives the first indication information sent by the UPF network element, the third indication information may be sent to the UPF network element, or the terminal device may send the third indication information.

It can be understood that the content of the first indication information sent by the terminal device may be similar to the content of the first indication information sent by the UPF network element. The solution described above is applicable to both the terminal device and the UPF network element.

The manners of triggering the terminal device and the UPF network element to send the first indication information are separately described in the following.

The sending, by the terminal device, the first indication information to the SMF network element or the UPF network element may be that the terminal device sends the first indication information to the SMF network element or the UPF network when it is detected that the switching condition in the ATSSS rule is satisfied, where the switching condition is a condition of switching to the second access technology of the QoS flow.

The ATSSS rule may be sent by the SMF network element to the terminal device. The ATSSS rule may be used for the terminal device to determine the QoS flow's access technology to which the data will be transmitted. In addition, a switching condition is also configured in the ATSSS rule. Upon detecting satisfaction of the switching condition, the terminal device may switch the data to another access technology for transmission. The switching condition may be, for example, that 3GPP is used first for transmission when 3GPP is available, and non-3GPP is used for transmission when 3GPP is not available.

For example, when transmitting data in a PDU session, the terminal device may, according to the QoS rule, determine the QoS flow to which the data will be transmitted. Further, according to the ATSSS rule, the terminal device may determine the QoS flow's access technology to which the data will be transmitted. It is assumed that according to the ATSSS rules, the terminal device determines that the data is currently transmitted on a non-3GPP access technology. When the terminal device detects that the 3GPP access technology is available, that is, the switching condition in the ATSSS rule is satisfied, the terminal device needs to switch the data to the 3GPP access technology for transmission.

The sending, by the UPF network element, the first indication information to the SMF network element may be that the UPF network element passively sends the first indication information to the SMF network element at the request of the terminal device, or that the UPF network element actively sends the first indication information to the SMF network element.

For example, the UPF network element may receive fourth indication information sent by the terminal device. The fourth indication information may be used to instruct to establish a network resource corresponding to the second access technology of the QoS flow. The UPF may send the first indication information to the SMF network element according to the fourth indication information, to instruct to establish, for the terminal device, a network resource corresponding to the second access technology of the QoS flow.

For another example, the SMF network element may send a QoS flow configuration parameter to the UPF network element. The configuration parameter may include, for example, second indication information that is used to indicate whether establishment of the network resource corresponding to the first access technology and the second access technology of the QoS flow is allowed. The ATSSS rule may be used to indicate the switching condition for switching to another access technology. The QoS rule may be used to indicate the QoS flow of data transmission. Optionally, the SMF may also send a correspondence between the ATSSS rule identifier and the QoS flow identifier to the UPF network element.

After receiving the parameter, the UPF network element may monitor the network according to the switching condition in the ATSSS rule. Upon detecting that the switching condition in the ATSSS rule is satisfied, if the network resource corresponding to the access technology to which the data will be switched has not been established, the UPF network element may actively send the first indication information to the SMF network element. In addition, the UPF may also send a first identifier indicative of the QoS flow to the SMF network element. The first identifier may include an ATSSS rule identifier and/or a QoS flow identifier.

Similar to the method described above, the sending, by the UPF network element, the ATSSS identifier, may be sending the ATSSS rule identifier corresponding to the requested QoS flow to the SMF network element according to the correspondence between the ATSSS rule identifier and the QoS flow.

The foregoing descriptions use the 3GPP access technology and the non-3GPP access technology as an example, but this implementation of the present disclosure is not limited thereto, and a QoS flow may include other access technologies.

Figure 5:
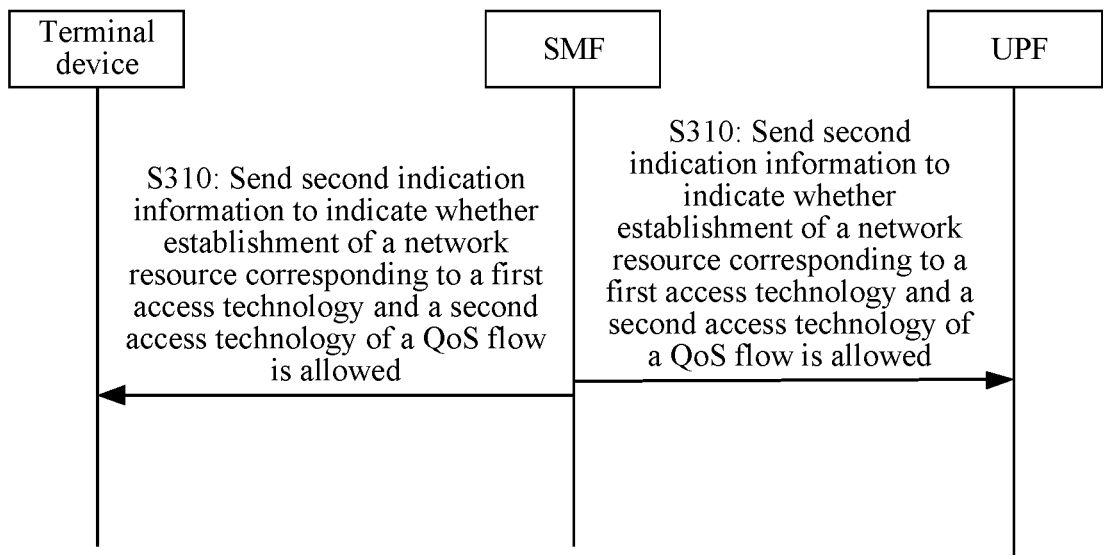
FIG. 5 is a schematic diagram of another method for establishing a resource according to an implementation of the present disclosure.

FIG. 5 shows another method for establishing a resource according to an implementation of the present disclosure. The method includes step 310.

S310: An SMF network element sends second indication information to a terminal device and/or a UPF network element, where the second indication information is used to indicate whether establishment of a network resource corresponding to a first access technology and a second access technology of a QoS flow is allowed, the first access technology is one of a 3GPP access technology and a non-3GPP access technology, and the second access technology is the other of the 3GPP access technology and the non-3GPP access technology.

Optionally, the second indication information may include an AN resource establishment mode.

In the technical solution according to this implementation of the present disclosure, the SMF network element may send the second indication information to the terminal device, where the second indication information indicates whether establishment of a network resource corresponding to two access technologies of one QoS flow is allowed, so that the terminal device can, according to the second indication information, determine whether establishment of a network resource corresponding to the second access technology of a QoS flow can be requested. This can prevent the terminal device from blindly requesting and being rejected, and can avoid waste of signaling.

When a network resource corresponding to the first access technology of the QoS flow is established, the terminal device may, according to the second indication information, determine whether to send first indication information to the SMF network element or the UPF network. The first indication information is used to instruct to establish a network resource corresponding to the second access technology of the QoS flow.

Alternatively, when it is determined that a network resource corresponding to the first access technology of the QoS flow has been established, the UPF network element may, according to the second indication information, determine whether to send first indication information to the SMF network element. The first indication information is used to instruct to establish a network resource corresponding to the second access technology of the QoS flow.

In the technical solution provided in this implementation of the present disclosure, the SMF network element may send some of its own decision information to the terminal device or the UPF network element. Therefore, the terminal device or the UPF network element can determine, according to the decision information, whether to request establishment of a network resource corresponding to the second access technology, rather than send the request blindly. This can avoid signaling waste caused by repeated requests and rejections.

The determining, by the terminal device according to the second indication information, whether to send the first indication information to the SMF network element or the UPF network element includes: if the second indication information indicates that the establishment of the network resource corresponding to the first access technology and the second access technology of the QoS flow is allowed, it indicates that the QoS flow supports MA technology, and the terminal device may request to establish a network resource corresponding to the second access technology of the QoS flow; if the second indication information does not allow establishment of a network resource corresponding to the first access technology and the second access technology of the QoS flow, it indicates that the QoS flow does not support MA technology, and the terminal device may skip sending the first indication information to the SMF network element or the UPF network element.

Similarly, the determining, by the UPF network element according to the second indication information, whether to send the first indication information to the SMF network element includes: if the second indication information indicates that the establishment of the network resource corresponding to the first access technology and the second access technology of the QoS flow is allowed, it indicates that the QoS flow supports MA technology, and the UPF network element may request to establish a network resource corresponding to the second access technology of the QoS flow; if the second indication information does not allow establishment of a network resource corresponding to the first access technology and the second access technology of the QoS flow, it indicates that the QoS flow does not support MA technology, and the UPF network element may skip sending the first indication information to the SMF network element.

The manner of sending the second indication information by the SMF network element is not limited in this implementation of the present disclosure. For example, the SMF network element may send the second indication information to the terminal device and/or the UPF network element while the terminal device requests to establish an MA-PDU session. Alternatively, the SMF network element may send the second indication information to the terminal device and/or the UPF network element while the terminal device or the UPF network element requests to update the session. Alternatively, the SMF network element may send the second indication information to the terminal device and/or the UPF network element while sending a correspondence between the ATSSS rule identifier and the QoS flow identifier to the terminal device and/or the UPF network element.

For example, after accessing the network, the terminal device may send an MA-PDU session establishment request to the SMF network element. After receiving the MA-PDU session request, the SMF network element may establish a session connection for the terminal device, and send, after the session connection is established, a PDU session establishment acceptance message to the terminal device, to indicate completion of establishing the PDU session. In the process of sending a PDU session establishment acceptance message, the SMF network element may also add the second indication information into such a message, and send the message to the terminal device altogether. In addition, during this process, the SMF network element may also send the second indication information to the UPF network element.

For another example, the terminal device may send NAS signaling to the SMF network element to request modification of the MA-PDU session. The terminal device may send an update session request message to the SMF network element. The update session request message may include a PDU session modification request. After receiving the update session request, the SMF network element may send a PDU session modification command to the terminal device. During this process, the SMF may add the second indication information into a PDU session modification command, and send the command to the terminal device altogether. In addition, during this process, the SMF network element may also send the PDU session modification command that carries the second indication information to the UPF network element.

For another example, the second indication information may be sent together with the correspondence between the ATSSS rule identifier and the QoS flow identifier. The second indication information and the correspondence between the ATSSS rule identifier and the QoS flow identifier may be carried in a PDU session establishment acceptance message, or in a PDU session modification command, or in other signaling or messages.

Of course, the SMF may also send the second indication information, the ATSSS rule identifier, and the QoS flow identifier separately. In other words, the second indication information, the ATSSS rule identifier, and the QoS flow identifier may be carried in different messages or signaling.

After determining that the second indication information allows establishment of the network resource corresponding to the second access technology of the QoS flow, the terminal device or the UPF network element may send the first indication information to the SMF network element to request establishment of the network resource corresponding to the second access technology of the QoS flow. For the specific request process, reference may be made to the foregoing description. To avoid repetition, details are omitted here.

Figure 6:
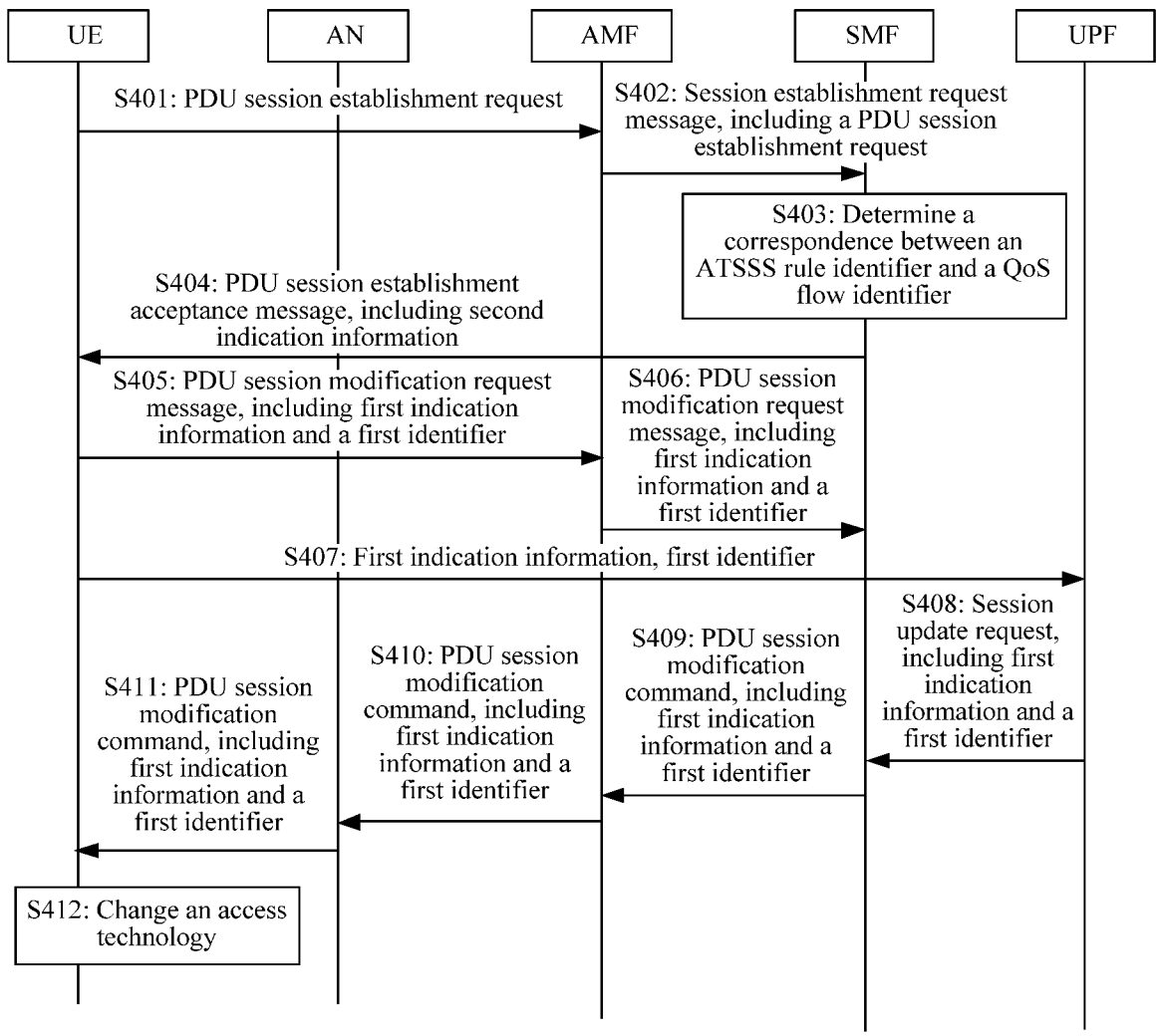
FIG. 6 is a schematic flowchart of still another method for establishing a resource according to an implementation of the present disclosure.

A method for establishing a resource according to this implementation of the present disclosure is described in detail below with reference to FIG. 6. The method in FIG. 6 includes steps 401 to 412.

S401: The UE may send a NAS message to the AMF to request establishment of an MA-PDU session. The NAS message may include a PDU session identifier and a PDU session establishment request message.

S402: After receiving the NAS message sent by the UE, the AMF may send a session establishment request message to the SMF. The session establishment request message may include a UE identifier, and the PDU session identifier and the PDU session establishment request message that are received in step S401.

S403: After receiving the PDU session establishment request message, the SMF may configure a parameter for the PDU session according to a specific rule or policy. The parameter may include, for example, the second indication information, an ATSSS rule, a PDU rule, the correspondence between the ATSSS rule identifier and the QoS flow identifier, and the like.

The specific rule and policy may include, for example, a policy and charging control (PCC) rule, and the SMF may define the parameter according to the PCC rule.

Generally, a PDU session may include one or more QoS flows, and the SMF may configure the QoS flow identifier and the parameter so that the UE determines the QoS flow on which the data should be transmitted in the PDU session.

The QoS flow may support one access technology or multiple access technologies. According to the PCC rule, the SMF may determine whether the QoS flow supports multiple access technologies, and indicate this by sending second indication information to the UE.

The second indication information may be, for example, an AN resource establishment mode. The AN resource establishment mode may be used to indicate whether the MA technology is supported. If the AN resource establishment mode indicates support of MA technology, assuming that the first access technology and the second access technology are supported, it indicates that establishment of the network resource corresponding to the first access technology and the second access technology of the QoS flow is allowed. If the AN resource establishment mode indicates only support of the first access technology, it indicates that establishment of only the network resource corresponding to the first access technology is allowed.

Optionally, the first access technology and the second access technology may be either a 3GPP access technology or a non-3GPP access technology, and the first access technology is different from the second access technology.

When the QoS flow supports MA technology, the ATSSS rule may be used to indicate the QoS flow's access technology on which the data sent by the UE should be transmitted. In addition, another function of the ATSSS rule is to indicate a switching condition. For example, the data is switched to another access technology for transmission when a specific condition is satisfied.

The UE may, according to the ATSSS rule, transmit the data on the access technology indicated by the ATSSS rule, and switch the data to another access technology for transmission when detecting that a link corresponding to the access technology satisfies the switching condition in the ATSSS rule.

The correspondence between the ATSSS rule identifier and the QoS flow identifier may be used for the UE to identify the QoS flow. For example, when requesting to establish a network resource corresponding to an access technology of a first QoS flow, the UE may send an ATSSS rule identifier corresponding to the first QoS flow to the SMF through the correspondence between the ATSSS rule identifier and the QoS flow identifier.

Of course, the UE may also directly send an identifier of the first QoS flow to request to establish a network resource corresponding to the access technology of the first QoS flow, which is not specifically limited in this implementation of the present disclosure. Optionally, the SMF may also establish, for the UE, a network resource corresponding to the first access technology of the QoS flow, so that the UE can transmit the data of this QoS flow onto the network resource corresponding to the first access technology.

S404: The SMF may send a PDU session establishment acceptance message to the UE to indicate completion of establishing the PDU session. The message may include the parameters determined in step S403, for example, may include at least one of the second indication information, the ATSSS rule, the QoS rule, the ATSSS rule identifier, or the QoS flow identifier.

S405: After receiving the second indication information, the UE may, according to the second indication information, determine whether a request can be sent to establish a network resource corresponding to another access technology for a specific QoS flow. If the second indication information indicates that a specific QoS flow supports MA technology, the UE can request to establish a network resource corresponding to another access technology for this QoS flow. If the second indication information indicates that a specific QoS flow supports a single access technology, the UE cannot request to establish a network resource corresponding to another access technology for this QoS flow.

In the case that the network resource corresponding to the first access technology of the QoS flow has been established, the UE may transmit data on the network resource corresponding to the first access technology of the QoS flow. When the UE detects that the link corresponding to the access technology satisfies the switching condition in the ATSSS rule, the UE needs to switch the data to the network resource corresponding to the second access technology for transmission. If the UE detects that an access network resource corresponding to the second access technology has not been established, the UE needs to request the SMF to establish the network resource corresponding to the second access technology.

The UE may use a PDU session modification request message to request to establish the network resource corresponding to the second access technology of a specific QoS flow.

For example, the UE may send a NAS message to the AMF. The NAS message may include a PDU session identifier and a PDU session modification request. The PDU session identifier may be used to indicate a session for which the UE requests to establish the network resource. The PDU session modification request may include first indication information and a first identifier, and the first identifier may be used to indicate a QoS flow. Assuming that the first identifier indicates the first QoS flow, the first indication information may be used to instruct to establish a network resource corresponding to the second access technology of the first QoS flow.

Optionally, the first identifier may include an ATSSS rule identifier and/or a QoS flow identifier.

In addition, the UE may also add a measurement result of the link corresponding to the access technology together into the PDU session modification request, and send the request to the SMF. The measurement result may be used to determine whether the UE currently satisfies the switching condition of switching to another access technology.

S406: The AMF may send an update session request message to the SMF according to the PDU session modification request sent by the UE. The update session request message may include a UE identifier, a PDU session identifier, and the PDU session modification request sent by the UE. The PDU session modification request may include first indication information and a first identifier.

Steps S405 and S406 above describe circumstances in which the UE requests, through the AMF, the SMF to establish a network resource corresponding to the second access technology of the QoS flow. This implementation of the present disclosure is not limited thereto. The UE may also request, through the following steps S407 and S408, to establish a network resource corresponding to the second access technology of the QoS.

It can be understood that when the UE requests to establish a network resource corresponding to the second access technology of the QoS flow, the request may be made by using the solution in steps S405 and S406, or made by using the solution in steps S407 and S408, or made by using both of the solutions.

S407: The UE may send the first indication information and the first identifier to the UPF through a data packet. In addition, the UE may also send a measurement result of the link corresponding to the access technology to the UPF. After receiving the measurement result, the UPF may, according to the measurement result, determine whether the first indication information needs to be sent to the SMF. For example, the UPF may, according to the measurement result, determine whether the switching condition in the ATSSS rule is satisfied. If the switching condition in the ATSSS rule is satisfied, the UPF sends the first indication information to the SMF.

It can be understood that the UE may send either the first indication information or the measurement result, or both the first indication information and the measurement result, to the UPF.

The UE may send the first indication information to the UPF, and the UPF sends the first indication information to the SMF at the request of the UE. Alternatively, the UE may send the measurement result of the link to the UPF, and the UPF determines, according to the measurement result, whether the first indication information needs to be sent to the SMF. When the first indication information needs to be sent, the UE sends the first indication information to the SMF. Alternatively, the UE may send both the first indication information and the measurement result to the UPF. Before sending the first indication information to the SMF, the UPF may check, according to the measurement result of the link, whether the first indication information needs to be sent to the SMF.

S408: The UPF may send an update session request to the SMF. The update session request may include a session identifier, the first indication information, and a first identifier.

The UPF may also send the measurement result of the link corresponding to the access technology to the SMF. According to the measurement result, the SMF may determine whether to establish a network resource. If the measurement result indicates satisfaction of the switching condition of switching to another access technology, the SMF may establish a network resource corresponding to another access technology.

Similar to the sending manner of the UE, the UPF may send either the measurement result or the first indication information, or both the measurement result and the first indication information.

Optionally, step S408 may be independent of step S407. That is, the sending, by the UPF, the first indication information to the SMF may be independent of the request of the UE, and the UPF may actively determine whether the network resource corresponding to the second access technology of the QoS flow needs to be established, and send the first indication information to the SMF when the network resource corresponding to the second access technology of the QoS flow needs to be established.

As an implementation, when sending the configuration parameter of the PDU session to the UE, the SMF may also send the configuration parameter of the PDU session to the UPF. The UPF may, according to the first indication information, determine whether a specific QoS flow supports MA technology, and monitor the link corresponding to the access technology of the QoS flow. If the QoS flow supports MA technology, and it is detected that the switching condition in the ATSSS rule is satisfied and that the network resource corresponding to another access technology of the QoS flow has not been established, the UPF may actively send the first indication information and the first identifier to the SMF. If the UPF also receives a correspondence between the ATSSS rule identifier and the QoS flow identifier from the SMF, the UPF may also send the ATSSS rule identifier corresponding to the QoS flow to the SMF.

S409: After receiving the first indication information and the first identifier sent by the UE or the UPF, the SMF learns that it is necessary to establish the network resource corresponding to the second access technology of the QoS flow corresponding to the first identifier. Further, according to a previously determined type of the access technology used by the QoS flow, the SMF may determine whether to establish a network resource corresponding to the second access technology of the QoS flow. If it is determined that the QoS flow supports MA technology, establishment of the network resource corresponding to the second access technology of the QoS flow is initiated.

S410: The SMF sends NIN2 message transmission signaling to the AMF. The message includes a UE identifier, an access type, and an N2 session management container. If the SMF receives the first indication information sent by the UE in step S405, the NIN2 transmission message may further include a PDU session modification command. The N2 session management container may include a PDU session identifier and a QoS policy. The PDU session modification command may include third indication information and a second identifier.

The second identifier is used to indicate the QoS flow, and the third indication information is used to indicate completion of establishing the network resource corresponding to the second access technology of the QoS flow indicated by the second identifier.

The second identifier may include an ATSSS rule identifier and/or a QoS flow identifier. The second identifier may be the same as or different from the first identifier.

S411: The AMF may send an N2 message to an AN. The N2 message may include a UE identifier, an N2 session management container, and a PDU session modification command. The N2 session management container may include a QoS configuration and a PDU session identifier. The PDU session modification command may include third indication information and a second identifier. When sending the N2 message, the AMF may, according to an access type, send the N2 SM container and the PDU session modification command in step S410 to the corresponding AN. For example, if the access type is 3GPP, the N2 SM container and the PDU session modification command may be sent to a RAN; if the access type is non-3GPP, the N2 SM container and the PDU session modification command may be sent to an N3IWF.

S412: The AN may configure an access network resource for the UE, and send the PDU session modification command to the UE through an AN message. The PDU session modification command may include third indication information indicating completion of the network resource corresponding to the second access technology of the QoS flow.

S413: After receiving the PDU session modification command, the UE is aware of completion of establishing the network resource corresponding to the second access technology of the QoS flow. According to the ATSSS rule identifier, when the switching condition in the ATSSS rule for switching to the second access technology is satisfied, the UE may switch the data to the network resource corresponding to the second access technology for transmission.

The foregoing has described in detail the method for establishing a resource according to an implementation of the present disclosure. The following describes an apparatus according to an implementation of the present disclosure in detail with reference to FIG. 7 to FIG. 15. The apparatus implementation corresponds to the method implementation, and therefore, for the content not described in detail here, see the foregoing method implementations.

Figure 7:
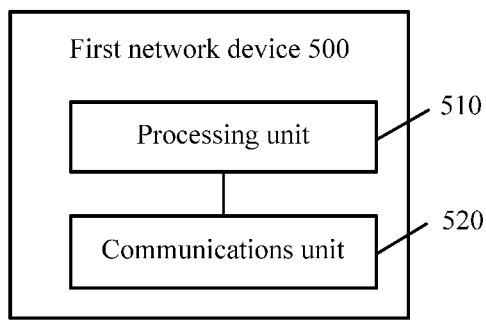
FIG. 7 is a schematic block diagram of a first network device according to an implementation of the present disclosure.

FIG. 7 is a schematic block diagram of a first network device 500 according to an implementation of the present disclosure. The first network device 500 shown in FIG. 7 may be an SMF network element device mentioned in the method implementation. The first network device may include a processing unit 510 and a communications unit 520.

The processing unit is configured to establish a network resource corresponding to a first access technology of a QoS flow.

The communications unit 520 is configured to receive first indication information sent by a terminal device or a user plane function (UPF) network element, where the first indication information is used to instruct to establish a network resource corresponding to a second access technology of the QoS flow, the first access technology is one of a Third-Generation Partnership Project (3GPP) access technology and a non-3GPP access technology, and the second access technology is the other of the 3GPP access technology and the non-3GPP access technology.

Optionally, the communications unit 520 is further configured to receive a first identifier sent by the terminal device or the UPF network element, where the first identifier is used to indicate the QoS flow.

Optionally, the first identifier includes an ATSSS rule identifier and/or a QoS flow identifier.

Optionally, the first identifier is an ATSSS rule identifier, and the processing unit 510 is further configured to determine the QoS flow according to a correspondence between the ATSSS rule identifier and the QoS flow identifier.

Optionally, the communications unit 520 is further configured to send the correspondence between the ATSSS rule identifier and the QoS flow identifier to the terminal device and/or the UPF network element.

Optionally, the processing unit 510 is configured to determine whether establishment of a network resource corresponding to the second access technology of the QoS flow is allowed; and, if it is determined that establishment of the network resource corresponding to the second access technology of the QoS flow is allowed, establish the network resource corresponding to the second access technology of the QoS flow.

Optionally, the communications unit 520 is further configured to send second indication information to the terminal device and/or the UPF network element, where the second indication information is used to indicate whether establishment of a network resource corresponding to the first access technology and the second access technology of the QoS flow is allowed.

Optionally, the communications unit 520 is further configured to send third indication information to the terminal device and/or the UPF network element, where the third indication information is used to indicate completion of establishing the network resource corresponding to the second access technology of the QoS flow.

Optionally, the communications unit 520 is further configured to send a second identifier to the terminal device or the UPF network element, where the second identifier is used to indicate the QoS flow.

Optionally, the second identifier includes an ATSSS rule identifier and/or a QoS flow identifier.

Optionally, the first indication information is carried in a non-access stratum (NAS) message and/or an update session request message.

It should be understood that, the first network device 500 may perform corresponding operations that are performed by the SMF network element in the foregoing method. For brevity, details are omitted here.

Figure 8:
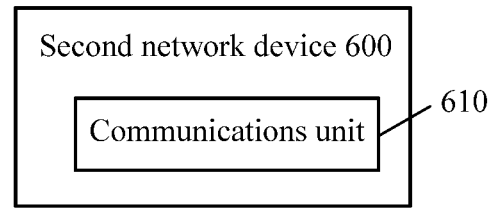
FIG. 8 is a schematic block diagram of a second network device according to an implementation of the present disclosure.

FIG. 8 is a schematic block diagram of a second network device 600 according to an implementation of the present disclosure. The second network device may be the SMF network element device described above, and the second network device 600 may include a communications unit 610.

The communications unit 610 is configured to send second indication information to a terminal device and/or a protocol data unit (UPF) network element, where the second indication information is used to indicate whether establishment of a network resource corresponding to a first access technology and a second access technology of a quality of service (QOS) flow is allowed, the first access technology is one of a Third-Generation Partnership Project (3GPP) access technology and a non-3GPP access technology, and the second access technology is the other of the 3GPP access technology and the non-3GPP access technology.

Optionally, the second indication information is carried in a PDU session establishment acceptance message.

Optionally, the second indication information is carried in a PDU session modification command.

Optionally, the communications unit is further configured to send a correspondence between an ATSSS rule identifier and a QoS flow identifier to the terminal device and/or the UPF network element, where the correspondence between the ATSSS rule identifier and the QoS flow identifier is carried in one piece of signaling or one message together with the second indication information.

It should be understood that, the second network device 600 may perform corresponding operations that are performed by the SMF network element in the foregoing method. For brevity, details are omitted here.

Figure 9:
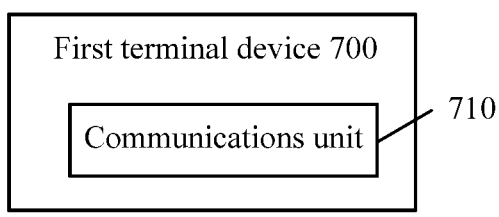
FIG. 9 is a schematic block diagram of a first terminal device according to an implementation of the present disclosure.

FIG. 9 is a schematic block diagram of a first terminal device 700 according to an implementation of the present disclosure. The first terminal device 700 may be the terminal device described above, and the first terminal device 700 includes a communications unit 710.

The communications unit 710 is configured to send first indication information to a session management function (SMF) network element or a user plane function (UPF) network element when a network resource corresponding to a first access technology of a quality of service (QOS) flow is established, where the first indication information is used to instruct to establish a network resource corresponding to a second access technology of the QoS flow, the first access technology is one of a Third-Generation Partnership Project (3GPP) access technology and a non-3GPP access technology, and the second access technology is the other of the 3GPP access technology and the non-3GPP access technology.

Optionally, the communications unit 710 is further configured to receive second indication information sent by the SMF network element, where the second indication information is used to indicate whether establishment of a network resource corresponding to the first access technology and the second access technology of the QoS flow is allowed. The first terminal device 700 further includes a processing unit, configured to determine, according to the second indication information, that the SMF network element allows establishment of the network resource corresponding to the second access technology of the QoS flow.

Optionally, the communications unit 710 is further configured to send a first identifier to the SMF network element or the UPF network element, where the first identifier is used to indicate the QoS flow.

Optionally, the first identifier includes an ATSSS rule identifier and/or a QoS flow identifier.

Optionally, the first identifier includes an ATSSS rule identifier, and the communications unit 710 is further configured to receive the correspondence that is sent by the SMF network element and that is between the ATSSS rule identifier and the QoS flow identifier; and send, according to the correspondence between the ATSSS rule identifier and the QoS flow identifier, the ATSSS identifier corresponding to the QoS flow to the SMF network element or the UPF network element.

Optionally, the communications unit 710 is further configured to receive third indication information sent by the SMF network element or the UPF network element, where the third indication information is used to indicate completion of establishing the network resource corresponding to the second access technology of the QoS flow.

Optionally, the communications unit 710 is further configured to receive a second identifier sent by the SMF network element or the UPF network element, where the second identifier is used to indicate the QoS flow.

Optionally, the second identifier includes an ATSSS rule identifier and/or a QoS flow identifier.

Optionally, the communications unit 710 is further configured to receive indication information sent by the SMF network element or the UPF network element and used to indicate completion of establishing the network resource corresponding to the second access technology of the QoS flow; and switch, according to an ATSSS rule, data of the QoS flow to the second access technology for transmission.

Optionally, the communications unit 710 is configured to send the first indication information to the SMF network element or the UPF network element when it is detected that a switching condition in the ATSSS rule is satisfied, where the switching condition is a condition of switching to the second access technology of the QoS flow.

Optionally, the first indication information is carried in a NAS message and/or an update session request message.

It should be understood that, the first terminal device 700 may perform corresponding operations that are performed by a terminal device in the method. For brevity, details are omitted here.

Figure 10:
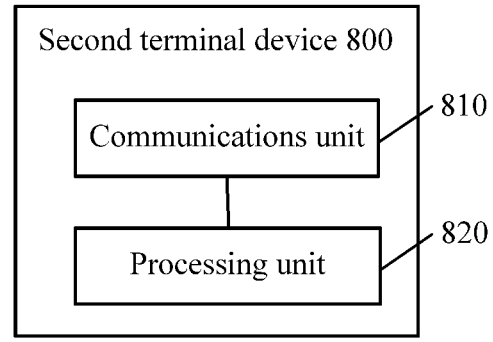
FIG. 10 is a schematic block diagram of a second terminal device according to an implementation of the present disclosure.

FIG. 10 is a schematic block diagram of a second terminal device 800 according to an implementation of the present disclosure. The second terminal device 800 may be the terminal device described above, and the second terminal device 800 includes a communications unit 810 and a processing unit 820.

The communications unit 810 is configured to receive second indication information sent by a session management function (SMF) network element, where the second indication information is used to indicate whether establishment of a network resource corresponding to a first access technology and a second access technology of a quality of service (QOS) flow is allowed, the first access technology is one of a 3GPP access technology and a non-3GPP access technology, and the second access technology is the other of the 3GPP access technology and the non-3GPP access technology.

The processing unit 820 is configured to determine, according to the second indication information when a network resource corresponding to the first access technology of the QoS flow is established, whether to send first indication information to the SMF network element or a user plane function (UPF) network element, where the first indication information is used to instruct to establish a network resource corresponding to the second access technology of the QoS flow.

Optionally, the processing unit 820 is configured to send the first indication information to the SMF network element or the UPF network element if the second indication information indicates that establishment of a network resource corresponding to the first access technology and the second access technology of the QoS flow is allowed; or send no first indication information to the SMF network element or the UPF network element if the second indication information indicates that establishment of a network resource corresponding to the first access technology and the second access technology of the QoS flow is not allowed.

Optionally, the second indication information is carried in a PDU session establishment acceptance message.

Optionally, the second indication information is carried in a PDU session modification command.

Optionally, the communications unit 810 is further configured to receive a correspondence between an ATSSS rule identifier and a QoS flow identifier, where the correspondence between the ATSSS rule identifier and the QoS flow identifier is sent by the SMF network element and carried in one piece of signaling or one message together with the second indication information.

It should be understood that, the second terminal device 800 may perform corresponding operations that are performed by a terminal device in the method. For brevity, details are omitted here.

Figure 11:
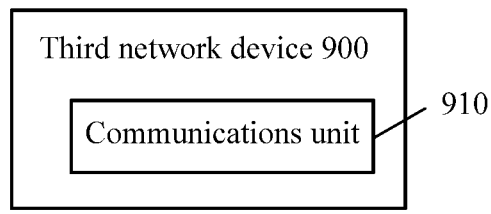
FIG. 11 is a schematic block diagram of a third network device according to an implementation of the present disclosure.

FIG. 11 is a schematic block diagram of a third network device 900 according to an implementation of the present disclosure. The third network device may be the UPF network element device described above. The third network device 900 includes a communications unit 910.

The communications unit 910 is configured to send first indication information to a session management function (SMF) network element when a network resource corresponding to a first access technology of a quality of service (QOS) flow is established, where the first indication information is used to instruct to establish, for a terminal device, a network resource corresponding to a second access technology of the QoS flow, the first access technology is one of a Third-Generation Partnership Project (3GPP) access technology and a non-3GPP access technology, and the second access technology is the other of the 3GPP access technology and the non-3GPP access technology.

Optionally, the communications unit 910 is configured to send the first indication information to the SMF network element when it is detected that a switching condition in the ATSSS rule is satisfied, where the switching condition is a condition of switching to the second access technology of the QoS flow.

Optionally, the communications unit 910 is further configured to receive second indication information sent by the SMF network element, where the second indication information is used to indicate whether establishment of a network resource corresponding to the first access technology and the second access technology of the QoS flow is allowed. The third network device 900 further includes a processing unit, configured to determine, according to the second indication information, that the SMF network element allows establishment of the network resource corresponding to the second access technology of the QoS flow.

Optionally, the communications unit 910 is further configured to receive fourth indication information sent by the terminal device, where the fourth indication information is used to instruct to establish a network resource corresponding to the second access technology of the QoS flow.

Optionally, the communications unit 910 is further configured to send a first identifier to the SMF network element, where the first identifier is used to indicate the QoS flow.

Optionally, the first identifier includes an ATSSS rule identifier and/or a QoS flow identifier.

Optionally, the communications unit 910 is further configured to receive the correspondence that is sent by the SMF network element and that is between the ATSSS rule identifier and the QoS flow identifier, and send, according to the correspondence between the ATSSS rule identifier and the QoS flow identifier, the ATSSS rule identifier corresponding to the QoS flow to the SMF network element.

Optionally, the communications unit 910 is further configured to receive third indication information sent by the SMF network element; and send fifth indication information to the terminal device according to the third indication information, where both the third indication information and the fifth indication information are used to indicate completion of establishing the network resource corresponding to the second access technology of the QoS flow.

Optionally, the communications unit 910 is further configured to send a second identifier to the SMF network element, where the second identifier is used to indicate the QoS flow.

Optionally, the second identifier includes an ATSSS rule identifier and/or a QoS flow identifier.

Optionally, the first indication information is carried in an update session request message.

It should be understood that, the third network device 900 may perform corresponding operations that are performed by the UPF network element in the foregoing method. For brevity, details are omitted here.

Figure 12:
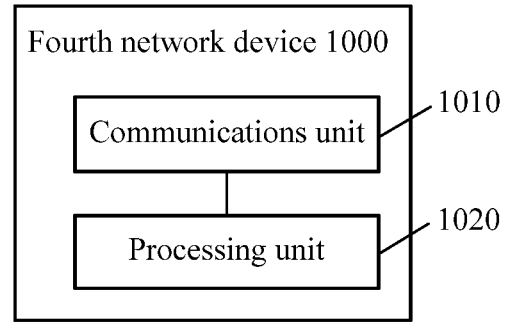
FIG. 12 is a schematic block diagram of a fourth network device according to an implementation of the present disclosure.

FIG. 12 is a schematic block diagram of a fourth network device 1000 according to an implementation of the present disclosure. The fourth network device 1000 may be the UPF network element device described above. The fourth network device 1000 may include a communications unit 1010 and a processing unit 1020.

The communications unit 1010 is configured to receive second indication information sent by a session management function (SMF) network element, where the second indication information is used to indicate whether establishment of a network resource corresponding to a first access technology and a second access technology of a quality of service (QOS) flow is allowed, the first access technology is one of a 3GPP access technology and a non-3GPP access technology, and the second access technology is the other of the 3GPP access technology and the non-3GPP access technology.

The processing unit 1020 is configured to determine, according to the second indication information when a network resource corresponding to the first access technology of the QoS flow is established, whether to send first indication information to the SMF network element, where the first indication information is used to instruct to establish a network resource corresponding to the second access technology of the QoS flow.

Optionally, the processing unit 1020 is configured to send the first indication information to the SMF network element if the second indication information indicates that establishment of a network resource corresponding to the first access technology and the second access technology of the QoS flow is allowed; or send no first indication information to the SMF network element if the second indication information indicates that establishment of a network resource corresponding to the first access technology and the second access technology of the QoS flow is not allowed.

Optionally, the second indication information is carried in a PDU session establishment acceptance message.

Optionally, the second indication information is carried in a PDU session modification command.

Optionally, the communications unit 1010 is further configured to receive a correspondence between an ATSSS rule identifier and a QoS flow identifier, where the correspondence between the ATSSS rule identifier and the QoS flow identifier is sent by the SMF network element and carried in one piece of signaling or one message together with the second indication information.

It should be understood that, the fourth network device 1000 may perform corresponding operations that are performed by the UPF network element in the foregoing method. For brevity, details are omitted here.

Figure 13:
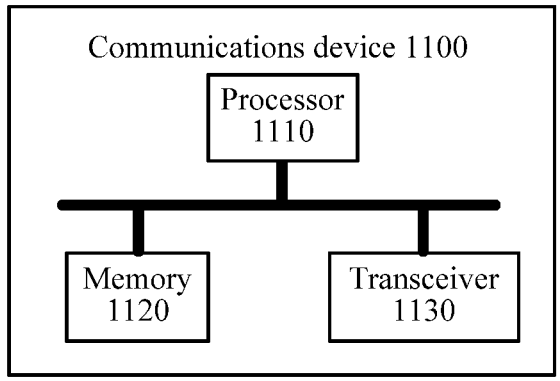
FIG. 13 is a schematic structural diagram of a communications device according to an implementation of the present disclosure.

FIG. 13 is a schematic structural diagram of a communications device 1100 according to an implementation of this application. The communications device 1100 shown in FIG. 13 includes a processor 1110. The processor 1110 may call a computer program from a memory and run the computer program, to implement the method in the implementations of this application.

Optionally, as shown in FIG. 13, the communications device 1100 may further include a memory 1120. The processor 1110 may call the computer program from the memory 1120 and run the computer program, to implement the method in the implementations of this application.

The memory 1120 may be a component independent of the processor 1110, or may be integrated into the processor 1110.

Optionally, as shown in FIG. 13, the communications device 1100 may further include a transceiver 1130, and the processor 1110 may control the transceiver 1130 to communicate with other devices, for example, send information or data to other devices, or receive information or data sent by other devices.

The transceiver 1130 may include a transmitter and a receiver. The transceiver 1130 may further include an antenna, and a quantity of antennas may be one or more.

Optionally, the communications device 1100 may specifically be the terminal device in the implementations of this application, and the communications device 1100 can implement corresponding procedures implemented by the terminal device in various methods in the implementations of this application. For brevity, details are not described herein again.

Optionally, the communications device 1100 may specifically be the network device in the implementations of this application, and the communications device 1100 can implement corresponding procedures implemented by the network device in various methods in the implementations of this application. For brevity, details are not described herein again.

Figure 14:
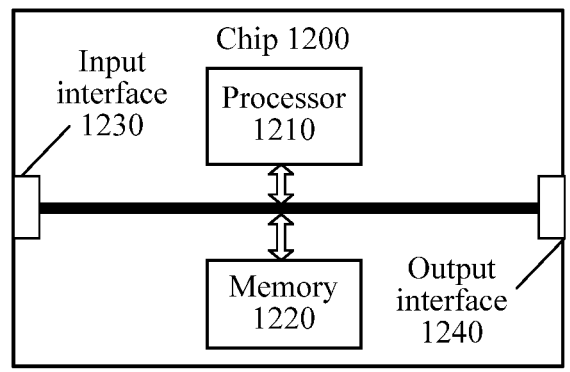
FIG. 14 is a schematic structural diagram of a chip according to an implementation of the present disclosure.

FIG. 14 is a schematic structural diagram of a chip according to an implementation of this application. The chip 1200 shown in FIG. 14 includes a processor 1210. The processor 1210 may call a computer program from a memory and run the computer program, to implement the method in the implementations of this application.

Optionally, as shown in FIG. 14, the chip 1200 may further include a memory 1220. The processor 1210 may call the computer program from the memory 1220 and run the computer program, to implement the method in the implementations of this application.

The memory 1220 may be a component independent of the processor 1210, or may be integrated into the processor 1210.

Optionally, the chip 1200 may further include an input interface 1230. The processor 1210 may control the input interface 1230 to communicate with another device or chip, and specifically, may obtain information or data sent by another device or chip.

Optionally, the chip 1200 may further include an output interface 1240. The processor 1210 may control the output interface 1240 to communicate with another device or chip, and specifically, may output information or data to another device or chip.

Optionally, the chip may be applied to the terminal device in the implementations of this application, and the chip can implement corresponding procedures implemented by the terminal device in various methods in the implementations of this application. For brevity, details are not described herein again.

Optionally, the chip may be applied to the network device in the implementations of this application, and the chip can implement corresponding procedures implemented by the network device in various methods in the implementations of this application. For brevity, details are not described herein again.

It should be noted that, the chip mentioned in the implementations of this application may also be referred to as a system-level chip, a system chip, a chip system, a system on chip, or the like.

It should be understood that, the processor of this implementation of this application may be an integrated circuit chip, and has a signal processing capability. During implementation, the steps of the foregoing method implementation may be implemented by using a hardware integrated logic circuit in the processor or implemented by using an instruction in a software form. The foregoing processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logical device, discrete gate or transistor logical device, or discrete hardware component. It may implement or perform the methods, the steps, and logical block diagrams that are disclosed in the implementations of this application. The general-purpose processor may be a microprocessor, or the processor may be any conventional processor or the like. Steps of the methods disclosed with reference to the implementations of this application may be directly performed and completed by using a hardware decoding processor, or may be performed and completed by using a combination of hardware and a software module in the decoding processor. The software module may be located in a mature storage medium in the art, such as a random access memory (RAM), a flash memory, a read-only memory (ROM), a programmable ROM (PROM), an electrically erasable programmable memory, or a register. The storage medium is located in the memory, and the processor reads information in the memory and completes the steps in the foregoing methods in combination with hardware of the processor.

It can be understood that, the memory in the implementations of this application may be a volatile memory or a non-volatile memory, or may include both a volatile memory and a non-volatile memory. The non-volatile memory may be a ROM, a PROM, an erasable PROM (EPROM), an electrically EPROM (EEPROM) or a flash memory. The volatile memory may be a RAM, and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that, the memory for the system and the method described herein aims to include but not limited to these memories and any other suitable types of memories.

It should be understood that, the memory is an example but is not intended for limitation. For example, the memory in the implementations of the present invention may alternatively be an SRAM, a DRAM, an SDRAM, a DDR SDRAM, an ESDRAM, an SLDRAM, a DR RAM, and the like. That is, the memory in this implementation of this application aims to include but is not limited to these memories and any other suitable type of memory.

Figure 15:
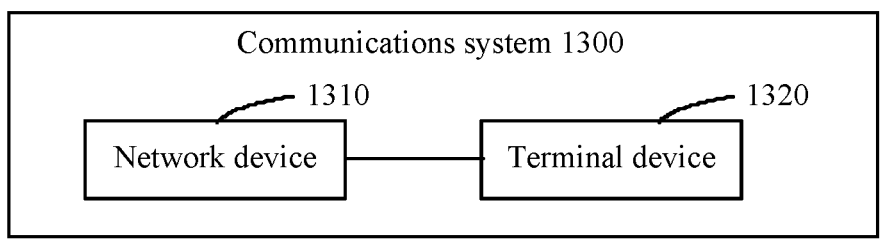
FIG. 15 is a schematic block diagram of a communications system according to an implementation of the present disclosure.

FIG. 15 is a schematic block diagram of a communications system 1300 according to an implementation of this application. As shown in FIG. 15, the communications system 1300 may include a network device 1310 and a terminal device 1320.

Optionally, the network device 1310 may be used to implement the corresponding functions implemented by the network device in the foregoing method, and the composition of the network device 1310 may be shown as the network device in FIG. 7, FIG. 8, FIG. 11, or FIG. 12. For brevity, details are not described herein again.

Optionally, the terminal device 1320 may be used to implement the corresponding functions implemented by the terminal device in the foregoing method, and the composition of the terminal device 1320 may be shown as the terminal device in FIG. 9 and FIG. 10. For brevity, details are not described herein again.

An implementation of this application further provides a computer-readable storage medium for storing a computer program. Optionally, the computer-readable storage medium may be applied to the network device in the implementations of this application, and the computer program causes a computer to implement corresponding procedures implemented by the network device in various methods in the implementations of this application. For brevity, details are not described herein again. Optionally, the computer-readable storage medium may be applied to the terminal device in the implementations of this application, and the computer program causes a computer to implement corresponding procedures implemented by the terminal device in various methods in the implementations of this application. For brevity, details are not described herein again.

An implementation of this application further provides a computer program product, including a computer program instruction. Optionally, the computer program product may be applied to the network device in the implementations of this application, and the computer program instruction causes a computer to implement corresponding procedures implemented by the network device in various methods in the implementations of this application. For brevity, details are not described herein again. Optionally, the computer program product may be applied to the terminal device in the implementations of this application, and the computer program instruction causes a computer to implement corresponding procedures implemented by the terminal device in various methods in the implementations of this application. For brevity, details are not described herein again.

An implementation of this application further provides a computer program. Optionally, the computer program may be applied to the network device in the implementations of this application, and the computer program, when run in a computer, causes the computer to implement corresponding procedures implemented by the network device in various methods in the implementations of this application. For brevity, details are not described herein again. Optionally, the computer program may be applied to the terminal device in the implementations of this application, and the computer program, when run in a computer, causes the computer to implement corresponding procedures implemented by the terminal device in various methods in the implementations of this application. For brevity, details are not described herein again.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

It should be understood that in this implementation of the present disclosure, "B corresponding to A" indicates that B is associated with A, and B may be determined based on A. However, it should further be understood that determining A according to B does not mean that B is determined according to A only; that is, B may also be determined according to A and/or other information.

A person of ordinary skill in the art may notice that the exemplary units and algorithm steps described with reference to the implementations disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method implementations, and details are not described herein again.

In the several implementations provided in this application, it should be understood that the disclosed system, apparatus, and method may be implemented in other manners. For example, the described apparatus implementations are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementations.

In addition, functional units in the implementations of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the implementation of this application. The foregoing storage medium includes: any medium that can store program code, such as a USB flash drive, a removable hard disk, a ROM, a RAM, a magnetic disk, or an optical disc.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method for establishing a resource, comprising:
    establishing a network resource corresponding to a first access technology of a quality of service (QOS) flow; and
    receiving first indication information sent by a user plane function (UPF) network element, wherein the first indication information is determined to be sent by the UPF based on the measurement report sent by a UE to the UPF; wherein the first indication information is used to instruct to establish a network resource corresponding to a second access technology of the QoS flow, the first access technology is one of a Third-Generation Partnership Project (3GPP) access technology or a non-3GPP access technology, and the second access technology is the other of the 3GPP access technology or the non-3GPP access technology; wherein the method further comprises:
    receiving a first identifier sent by the UPF network element, wherein the first identifier is used to indicate the QoS flow; wherein the first identifier comprises an access traffic steering, switching and splitting (ATSSS) rule identifier and/or a QoS flow identifier; wherein the method further comprises:
    determining whether establishment of the network resource corresponding to the second access technology of the QoS flow is allowed; and
    establishing, if it is determined that the establishment of the network resource corresponding to the second access technology of the QoS flow is allowed, the network resource corresponding to the second access technology of the QoS flow.

2. The method according to claim 1, wherein the first identifier is an ATSSS rule identifier, and the method further comprises:
    determining the QoS flow according to a correspondence between the ATSSS rule identifier and the QoS flow identifier.

3. The method according to claim 1, further comprising:
    sending the correspondence between the ATSSS rule identifier and the QoS flow identifier to the UPF network element.

4. The method according to claim 1, further comprising:
    sending second indication information to the UPF network element, wherein the second indication information is used to indicate whether establishment of a network resource corresponding to the first access technology and the second access technology of the QoS flow is allowed.

5. The method according to claim 1, further comprising:
    sending third indication information to the UPF network element, wherein the third indication information is used to indicate completion of establishing the network resource corresponding to the second access technology of the QoS flow.

6. The method according to claim 5, further comprising:
    sending a second identifier to the UPF network element, wherein the second identifier is used to indicate the QoS flow.

7. The method according to claim 6, wherein the second identifier comprises an ATSSS rule identifier and/or a QoS flow identifier.

8. The method according to claim 1, wherein the first indication information is carried in a non-access stratum (NAS) message and/or an update session request message.

9. A method for establishing a resource, comprising:
    sending first indication information to a session management function (SMF) network element when a network resource corresponding to a first access technology of a quality of service (QoS) flow is established, wherein the first indication is determined to be sent to the SMF based on the measurement report sent by a UE; wherein the first indication information is used to instruct to establish a network resource corresponding to a second access technology of the QoS flow, the first access technology is one of a Third-Generation Partnership Project (3GPP) access technology or a non-3GPP access technology, and the second access technology is the other of the 3GPP access technology or the non-3GPP access technology; wherein the method further comprises:

sending a first identifier to the SMF network element, wherein the first identifier is used to indicate the QoS flow; wherein the first identifier comprises an access traffic steering, switching and splitting (ATSSS) rule identifier and/or a QoS flow identifier; wherein the method further comprises:

receiving second indication information sent by the SMF network element, wherein the second indication information is used to indicate whether establishment of a network resource corresponding to the second access technology of the QoS flow is allowed; and determining, according to the second indication information, that the SMF network element allows establishment of the network resource corresponding to the second access technology of the QoS flow.

10. The method according to claim 9, further comprising:
receiving indication information sent by the SMF network element and used to indicate completion of establishing the network resource corresponding to the second access technology of the QoS flow; and switching, according to an ATSSS rule, data of the QoS flow to the second access technology for transmission.

11. A first network device, comprising a memory and a processor,
wherein the processor is configured to execute instructions stored in the memory to perform following operations:

establishing a network resource corresponding to a first access technology of a quality of service (QOS) flow; and receiving first indication information sent by a user plane function (UPF) network element, wherein the first indication information is determined to be sent by the UPF based on the measurement report sent by a UE to the UPF; wherein the first indication information is used to instruct to establish a network resource corresponding to a second access technology of the QoS flow, the first access technology is one of a Third-Generation Partnership Project (3GPP) access technology or a non-3GPP access technology, and the second access technology is the other of the 3GPP access technology or the non-3GPP access technology; wherein the processor is further configured to execute instructions stored in the memory to perform following operations: receiving a first identifier sent by the terminal device or the UPF network element, wherein the first identifier is used to indicate the QoS flow; wherein the first identifier comprises an access traffic steering, switching and splitting (ATSSS) rule identifier and/or a QoS flow identifier; wherein the processor is further configured to execute instructions stored in the memory to perform following operations:

determining whether establishment of the network resource corresponding to the second access technology of the QoS flow is allowed; and establishing, if it is determined that the establishment of the network resource corresponding to the second access technology of the QoS flow is allowed, the network resource corresponding to the second access technology of the QoS flow.

12. The method according to claim 9, wherein the first indication information is carried in a non-access stratum (NAS) message and/or an update session request message.

13. The first network device according to claim 11, wherein the first identifier is an ATSSS rule identifier, and the processor is further configured to execute instructions stored in the memory to perform following operations:
determining the QoS flow according to a correspondence between the ATSSS rule identifier and the QoS flow identifier.

14. The first network device according to claim 11, wherein the processor is further configured to execute instructions stored in the memory to perform following operations:
sending the correspondence between the ATSSS rule identifier and the QoS flow identifier to the UPF network element.

15. The first network device according to claim 11, wherein the processor is further configured to execute instructions stored in the memory to perform following operations: sending second indication information to the UPF network element, wherein the second indication information is used to indicate whether establishment of a network resource corresponding to the first access technology and the second access technology of the QoS flow is allowed.

16. The first network device according to claim 11, wherein the processor is further configured to execute instructions stored in the memory to perform following operations: sending third indication information to the UPF network element, wherein the third indication information is used to indicate completion of establishing the network resource corresponding to the second access technology of the QoS flow.

17. The first network device according to claim 16, wherein the processor is further configured to execute instructions stored in the memory to perform following operations: sending a second identifier to the UPF network element, wherein the second identifier is used to indicate the QoS flow.

18. The first network device according to claim 17, wherein the second identifier comprises an ATSSS rule identifier and/or a QoS flow identifier.

* * * * *